US008844342B2

(12) United States Patent
Kitahara et al.

(10) Patent No.: US 8,844,342 B2
(45) Date of Patent: Sep. 30, 2014

(54) AIR FLOW MEASURING DEVICE

(75) Inventors: Noboru Kitahara, Kariya (JP); Takashi Ooga, Kariya (JP); Takao Ban, Toyohashi (JP)

(73) Assignee: Denso Corporation, Kariya (JP)

( * ) Notice: Subject to any disclaimer, the term of this patent is extended or adjusted under 35 U.S.C. 154(b) by 216 days.

(21) Appl. No.: 13/604,652

(22) Filed: Sep. 6, 2012

(65) Prior Publication Data

US 2013/0055800 A1  Mar. 7, 2013

(30) Foreign Application Priority Data

Sep. 7, 2011  (JP) ................................. 2011-194466
Apr. 19, 2012  (JP) .................................. 2012-95963

(51) Int. Cl.
*G01M 15/04* (2006.01)
(52) U.S. Cl.
CPC .................... *G01M 15/04* (2013.01)
USPC ...................................................... 73/114.34
(58) Field of Classification Search
CPC ....... G01F 5/00; G01M 15/04; G01M 15/042; G01M 15/048
USPC ............... 73/114.31, 114.32, 114.33, 114.34, 73/202, 202.5
See application file for complete search history.

(56) References Cited

U.S. PATENT DOCUMENTS

| 8,701,474 | B2 * | 4/2014 | Tagawa ....................... 73/114.32 |
| 2006/0021429 | A1 | 2/2006 | Konzelmann et al. | |
| 2008/0307869 | A1 | 12/2008 | Kamiya | |
| 2012/0240668 | A1 * | 9/2012 | Goka et al. ................. 73/114.32 |
| 2012/0291519 | A1 * | 11/2012 | Kitahara ........................ 73/1.16 |
| 2013/0008243 | A1 * | 1/2013 | Tagawa ..................... 73/114.32 |
| 2013/0014572 | A1 * | 1/2013 | Kitahara .................... 73/114.32 |
| 2013/0014573 | A1 * | 1/2013 | Kamiya et al. ............. 73/114.32 |
| 2013/0019675 | A1 * | 1/2013 | Ban et al. ........................ 73/202 |

FOREIGN PATENT DOCUMENTS

DE  10 2008 042 807  4/2010
JP  61-199623  12/1986

OTHER PUBLICATIONS

Office Action (1 page) dated Dec. 10, 2013, issued in corresponding Japanese Application No. 2012-095963 and English translation (2 pages).

* cited by examiner

*Primary Examiner* — Eric S McCall
(74) *Attorney, Agent, or Firm* — Nixon & Vanderhye P.C.

(57) ABSTRACT

An air flow measuring device includes a housing, a sensor, and a throttle that is provided on an outer wall surface of the housing. The throttle merges together a bypass-passing flow and an outside-passing flow, and guides the merged flow toward the downstream side with the merged flow narrowed. The throttle includes two raised portions and a cover that bridges between the two raised portions and is opposed to the outer wall surface of the housing. The cover includes an inner surface exposed to the throttle, and an outer surface exposed to outside of the throttle. A peripheral border of the cover includes an upstream edge which defines the outer surface on the upstream side. At least a region of the outer surface including the upstream edge is swollen more outwardly in a shape of a projecting curved surface further on the downstream side.

9 Claims, 10 Drawing Sheets

UPSTREAM SIDE ←――――→ DOWNSTREAM SIDE
INTAKE AIR MAINSTREAM FLOW

UPSTREAM SIDE ←――――→ DOWNSTREAM SIDE
INTAKE AIR MAINSTREAM FLOW

UPSTREAM SIDE ←――――→ DOWNSTREAM SIDE
INTAKE AIR MAINSTREAM FLOW

UPSTREAM SIDE ←————→ DOWNSTREAM SIDE
INTAKE AIR MAINSTREAM FLOW

UPSTREAM SIDE ←————→ DOWNSTREAM SIDE
INTAKE AIR MAINSTREAM FLOW

UPSTREAM SIDE ←————→ DOWNSTREAM SIDE
INTAKE AIR MAINSTREAM FLOW

INTAKE AIR MAINSTREAM FLOW
UPSTREAM SIDE ⟵⟶ DOWNSTREAM SIDE

INTAKE AIR MAINSTREAM FLOW
UPSTREAM SIDE ⟵⟶ DOWNSTREAM SIDE

INTAKE AIR MAINSTREAM FLOW
UPSTREAM SIDE ⟵⟶ DOWNSTREAM SIDE

INTAKE AIR MAINSTREAM FLOW
UPSTREAM SIDE ←——→ DOWNSTREAM SIDE

INTAKE AIR MAINSTREAM FLOW
UPSTREAM SIDE ←——→ DOWNSTREAM SIDE

INTAKE AIR MAINSTREAM FLOW
UPSTREAM SIDE ←——→ DOWNSTREAM SIDE

INTAKE AIR MAINSTREAM FLOW
UPSTREAM SIDE ⟵⟶ DOWNSTREAM SIDE

INTAKE AIR MAINSTREAM FLOW
UPSTREAM SIDE ⟵⟶ DOWNSTREAM SIDE

INTAKE AIR MAINSTREAM FLOW
UPSTREAM SIDE ⟵⟶ DOWNSTREAM SIDE

AIR FLOW MEASURING DEVICE

CROSS REFERENCE TO RELATED APPLICATION

This application is based on Japanese Patent Application No. 2011-194466 filed on Sep. 7, 2011 and Japanese Patent Application No. 2012-95963 filed on Apr. 19, 2012, the disclosure of which are incorporated herein by reference.

TECHNICAL FIELD

The present disclosure relates to an air flow measuring device that measures a flow rate of air.

BACKGROUND

Conventionally, a thermal-type air flow measuring device for measuring an air flow rate by use of heat transfer between the device and air is widely known. The air flow measuring device is disposed in an intake passage leading to an internal combustion engine to be used for measuring the flow rate of intake air suctioned into the engine (flow rate of intake air may be hereinafter referred to as an intake air amount).

More specifically, this air flow measuring device takes in a part of intake air flowing through the intake passage and generates an electrical signal in accordance with the intake air amount. The air flow measuring device includes a housing that defines a bypass flow passage through which the taken-in intake air flows, and a sensor that is accommodated in the bypass flow passage to produce the electrical signal as a result of heat transfer between the sensor and the taken-in intake air. The air flow measuring device reduces the influence of turbulence of intake air in the intake passage by arranging the sensor in the bypass flow passage instead of disposing the sensor directly in the intake passage, through which intake air passes, so as to output a measurement value with few variations.

In addition, pulsation is inevitably caused in the intake air flowing through the intake passage in accordance with opening and closing of a valve of the engine. Accordingly, the intake air amount changes over time, fluctuating between a larger-side peak value of the pulsation and a smaller-side peak value of the pulsation. As a result, due to the thermal-type measuring method whereby the measured value is outputted using the heat transfer with air, the measured value is lower than a central value of the pulsation as a true value, and a negative-side error is thereby produced. Consequently, in the air flow measuring device, by making longer a passage length L2 of the bypass flow passage than a passage length L1 when air flows straight through the intake passage without flowing through the bypass flow passage, an increase range of the measurement value in accordance with a value of L2/L1 are set, and the negative-side error of the measurement value is thereby resolved.

The negative-side error varies according to the intake air amount, and the negative-side error becomes larger as the intake air amount is larger. For this reason, even if L2/L1 is set such that the negative-side error becomes 0 (Zero) with respect to when the intake air amount is a particular value, when the intake air amount changes from the particular value to the smaller-side, for example, the increase range due to L2/L1 becomes excessive. Therefore, conversely, the measured value including a positive-side error is outputted.

Thus, in the case of measurement of a flow rate of a flow with pulsation by the thermal-type air flow measuring device, due to the setting of L2/L1, upon variation of the flow rate on the smaller-side from a measuring range of the flow rate that can eliminate the negative-side error and positive-side error without excess or deficiency (hereinafter referred to as an error eliminable range), the positive-side error is produced in the measured value.

An air flow measuring device described in DE 102008042807 A1 includes a configuration for curbing generation of a vortical flow on a downstream side of an outlet of a bypass flow passage along an outer wall surface of a housing. More specifically, in the air flow measuring device in DE 102008042807 A1, two ribs parallel to the flow of intake air are provided so as to sandwich the outlet of the bypass flow passage between the ribs on the outer wall surface of the housing, and a cover that bridges between the two ribs on the downstream side of the outlet is further provided. Accordingly, it is described that the flow along the outer wall surface of the housing can be stabilized on the downstream side of the outlet as a result of the inhibition of the generation of the vortical flow. However, although the generation of the vortical flow can be limited, the configuration of DE 102008042807 A1 cannot deal with the generation of the positive-side error due to the variation of the intake air amount on the smaller-side.

SUMMARY

According to the present disclosure, there is provided an air flow measuring device that is adapted to be disposed in an intake passage through which intake air drawn into an internal combustion engine flows and that is configured to take in a part of intake air flowing through the intake passage and to produce an electrical signal which is in accordance with a flow rate of intake air in the intake passage. The air flow measuring device includes a housing, a sensor, and a throttle. The housing defines a bypass flow passage through which the taken-in intake air passes. The sensor is accommodated in the bypass flow passage and is configured to generate the electrical signal as a result of heat transfer between the taken-in intake air and the sensor. The throttle is provided on an outer wall surface of the housing and is configured to merge together a bypass-passing flow out of an outlet of the bypass flow passage via the bypass flow passage and an outside-passing flow in a flow direction of intake air in the intake passage along the outer wall surface of the housing without passing through the bypass flow passage and to guide the merged flow toward a downstream side in the flow direction of intake air in the intake passage with the merged flow narrowed. The throttle includes two raised portions and a cover. The two raised portions are raised from the outer wall surface of the housing with the outlet located therebetween. The cover bridges between the two raised portions and is opposed to the outer wall surface of the housing. The cover includes an inner surface exposed to the throttle, and an outer surface exposed to outside of the throttle. A peripheral border of the cover includes an upstream edge which defines the outer surface on an upstream side in the flow direction of intake air in the intake passage. At least a region of the outer surface including the upstream edge is swollen more outwardly in a shape of a projecting curved surface further on the downstream side in the flow direction of intake air in the intake passage.

According to the present disclosure, there is also provided an air flow measuring device that is adapted to be disposed in an intake passage through which intake air drawn into an internal combustion engine flows and that is configured to take in a part of intake air flowing through the intake passage and to produce an electrical signal which is in accordance with a flow rate of intake air in the intake passage. The air flow measuring device includes a housing, a sensor, and a throttle. The housing defines a bypass flow passage through which the taken-in intake air passes. The sensor is accommodated in the bypass flow passage and is configured to generate the electrical signal as a result of heat transfer between the taken-in intake air and the sensor. The throttle is provided on an outer wall surface of the housing and is configured to merge together a bypass-passing flow out of an outlet of the bypass flow passage via the bypass flow passage and an outside-passing flow in a flow direction of intake air in the intake passage along the outer wall surface of the housing without passing through the bypass flow passage and to guide the merged flow toward a downstream side in the flow direction of intake air in the intake passage with the merged flow narrowed. The throttle includes two raised portions and a cover. The two raised portions are raised from the outer wall surface of the housing with the outlet located therebetween. The cover bridges between the two raised portions and is opposed to the outer wall surface of the housing. The cover includes an inner surface exposed to the throttle, and an outer surface exposed to outside of the throttle. A peripheral border of the cover includes an upstream edge which defines the outer surface on an upstream side in the flow direction of intake air in the intake passage. The outer surface includes a plurality of outer ribs that are not perpendicular to the flow direction of intake air in the intake passage. Ridge lines of the plurality of outer ribs and the upstream edge are formed to be included in an imaginary projecting curved surface that is swollen outward of the throttle. At least a region of the imaginary projecting curved surface including the upstream edge is swollen more outwardly in a shape of a projecting curved surface further on the downstream side in the flow direction of intake air in the intake passage.

According to the present disclosure, there is further provided an air flow measuring device that is adapted to be disposed in an intake passage through which intake air drawn into an internal combustion engine flows and that is configured to take in a part of intake air flowing through the intake passage and to produce an electrical signal which is in accordance with a flow rate of intake air in the intake passage. The air flow measuring device includes a housing, a sensor, and a throttle. The housing defines a bypass flow passage through which the taken-in intake air passes. The sensor is accommodated in the bypass flow passage and is configured to generate the electrical signal as a result of heat transfer between the taken-in intake air and the sensor. The throttle is provided on an outer wall surface of the housing and is configured to merge together a bypass-passing flow out of an outlet of the bypass flow passage via the bypass flow passage and an outside-passing flow in a flow direction of intake air in the intake passage along the outer wall surface of the housing without passing through the bypass flow passage and to guide the merged flow toward a downstream side in the flow direction of intake air in the intake passage with the merged flow narrowed. The throttle includes two raised portions and a cover. The two raised portions are raised from the outer wall surface of the housing with the outlet located therebetween. The cover bridges between the two raised portions and is opposed to the outer wall surface of the housing. The cover is not opposed to all of a narrow range of the outer wall surface of the housing located between root parts of the two raised portions, and is opposed partly to the narrow range.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
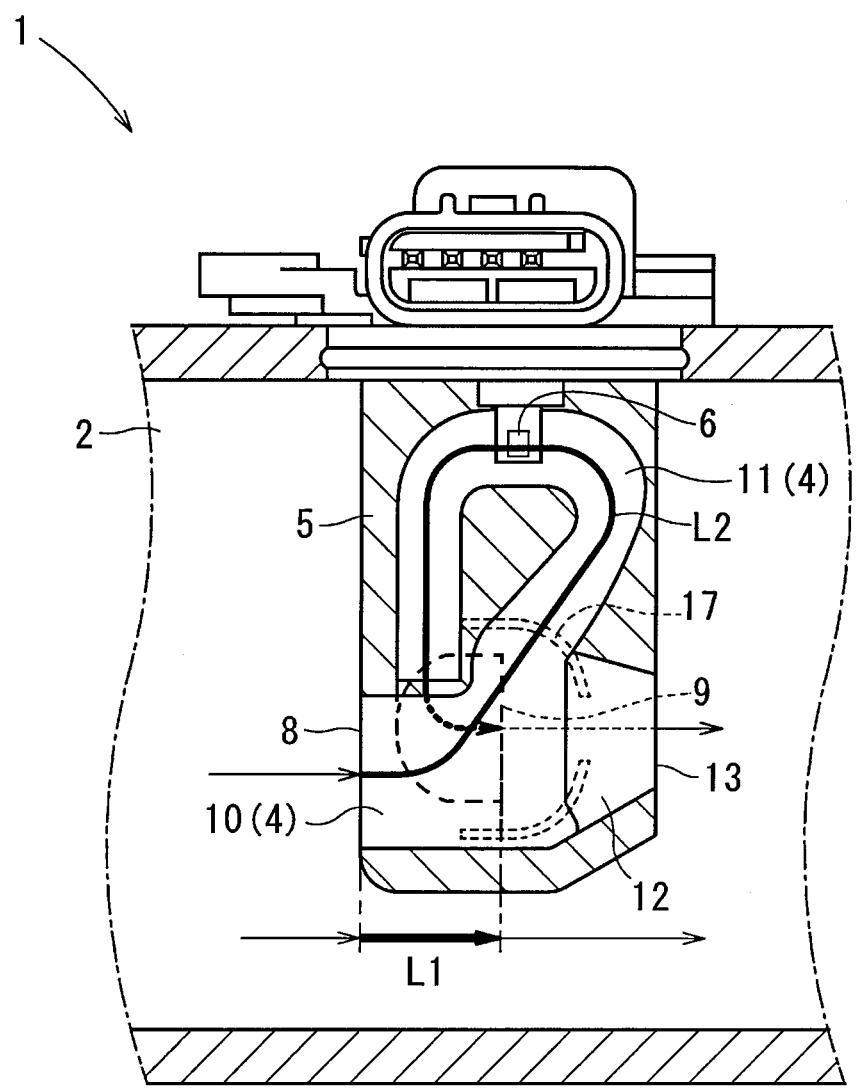
FIG. 1 is a sectional view illustrating inside of an air flow measuring device in accordance with a first embodiment.

An air flow measuring device of a first embodiment is adapted to be disposed in an intake passage through which intake air drawn into an internal combustion engine flows, and is configured to take in a part of intake air flowing through the intake passage and to produce an electrical signal which is in accordance with a flow rate of intake air in the intake passage. The air flow measuring device includes a housing, a sensor, and a throttle. The housing defines a bypass flow passage through which the taken-in intake air passes. The sensor is accommodated in the bypass flow passage and is configured to generate the electrical signal as a result of heat transfer between the taken-in intake air and the sensor. The throttle is provided on an outer wall surface of the housing and is configured to merge together a bypass-passing flow out of an outlet of the bypass flow passage via the bypass flow passage and an outside-passing flow in a flow direction of intake air in the intake passage along the outer wall surface of the housing without passing through the bypass flow passage and to guide the merged flow toward a downstream side in the flow direction of intake air in the intake passage with the merged flow narrowed. The throttle includes two raised portions and a cover. The two raised portions are raised from the outer wall surface of the housing with the outlet located therebetween. The cover bridges between the two raised portions and is opposed to the outer wall surface of the housing. The cover includes an inner surface exposed to the throttle, and an outer surface exposed to outside of the throttle. A peripheral border of the cover includes an upstream edge which defines the outer surface on an upstream side in the flow direction of intake air in the intake passage. At least a region of the outer surface including the upstream edge is swollen more outwardly in a shape of a projecting curved surface further on the downstream side in the flow direction of intake air in the intake passage.

According to an air flow measuring device of a second embodiment, the inner surface may be defined by the upstream edge on the upstream side in the flow direction of intake air in the intake passage. At least a region of the inner surface including the upstream edge may be swollen more toward the throttle in a shape of a projecting curved surface further on the downstream side in the flow direction of intake air in the intake passage.

According to an air flow measuring device of a third embodiment, a peripheral border of the cover includes an upstream edge which defines the outer surface on an upstream side in the flow direction of intake air in the intake passage. The outer surface includes a plurality of outer ribs that are not perpendicular to the flow direction of intake air in the intake passage. Ridge lines of the plurality of outer ribs and the upstream edge are formed to be included in an imaginary projecting curved surface that is swollen outward of the throttle. At least a region of the imaginary projecting curved surface including the upstream edge is swollen more outwardly in a shape of a projecting curved surface further on the downstream side in the flow direction of intake air in the intake passage.

The inner surface may include a plurality of inner ribs that are not perpendicular to the flow direction of intake air in the intake passage. Ridge lines of the plurality of inner ribs and the upstream edge may be formed to be included in another imaginary projecting curved surface that is swollen toward the throttle. At least a region of the another imaginary projecting curved surface including the upstream edge may be swollen more toward the throttle in a shape of a projecting curved surface further on the downstream side in the flow direction of intake air in the intake passage.

According to an air flow measuring device of a fourth embodiment, the cover is not opposed to all of a narrow range of the outer wall surface of the housing located between root parts of the two raised portions, and is opposed partly to the narrow range. At least a part of the upstream edge of the cover that separates off the upstream side of the cover between the two raised portions is advanced on the downstream side. According to an air flow measuring device of a fifth embodiment, at least a part of the downstream edge of the cover that separates off the downstream side of the cover between the two raised portions is receded on the upstream side.

(First Embodiment)

Figure 2A:
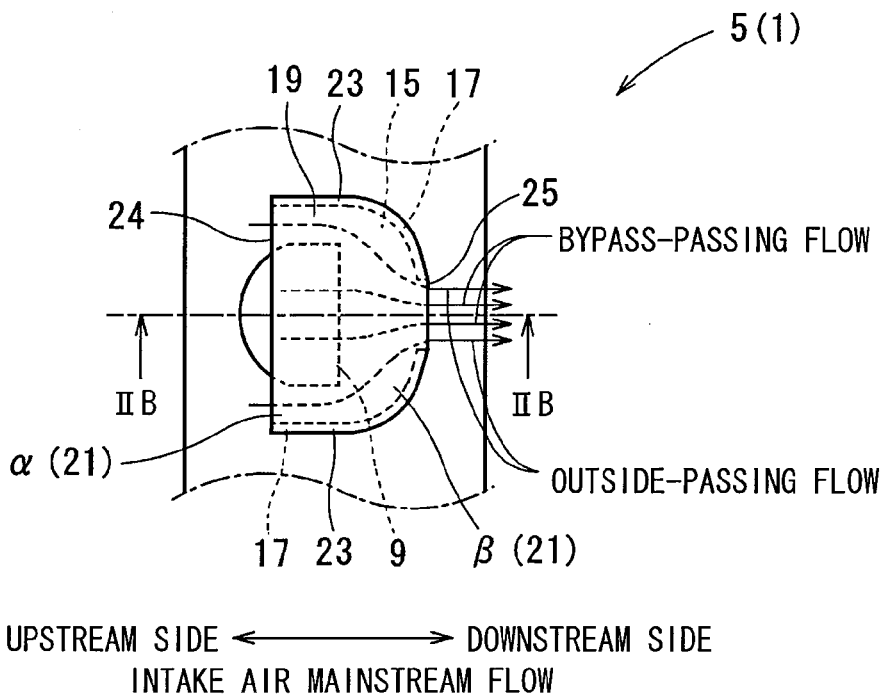
FIG. 2A is a partial side view illustrating the air flow measuring device of the first embodiment.
Figure 2B:
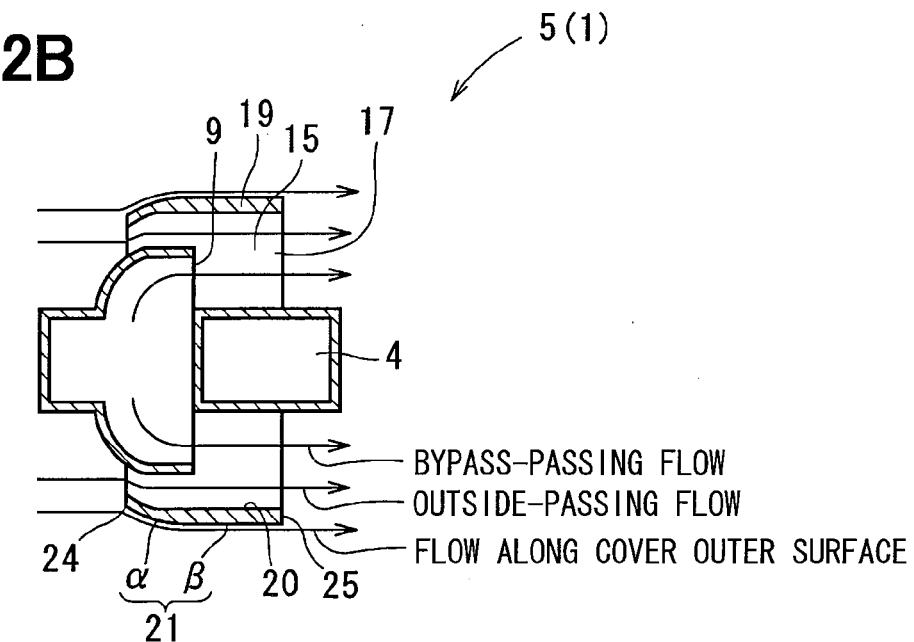
FIG. 2B is a sectional view taken along a line IIB-IIB in FIG. 2A.

Configuration of an air flow measuring device 1 of the first embodiment will be described with reference to FIGS. 1 to 2B. The air flow measuring device 1 measures an air flow rate by means of heat transfer between the device 1 and air. For example, the air flow measuring device 1 is disposed in an intake passage 2 to an internal combustion engine (not shown) and used for measuring a flow rate of intake air suctioned into the engine (intake air amount).

More specifically, the air flow measuring device 1 is disposed in the intake passage 2 and takes in a part of intake air flowing through the intake passage 2 (hereinafter referred to as an intake air mainstream) and generates an electrical signal in accordance with the intake air amount. The air flow measuring device 1 includes a housing 5 that defines a bypass flow passage 4 through which the taken-in intake air flows, and a sensor chip 6 that is accommodated in the bypass flow passage 4 to produce the electrical signal as a result of heat transfer between the sensor chip 6 and the taken-in intake air. The electrical signal generated in the sensor chip 6 is outputted to an electronic control unit (not shown) outside the air flow measuring device 1 through predetermined processing, to be used for, for example, various kinds of control processing such as fuel injection control.

The bypass flow passage 4 includes an inlet 8 for intake air that opens into the intake passage 2 toward an upstream side of the intake air mainstream, an outlet 9 for intake air that opens into the intake passage 2 toward a downstream side of the intake air mainstream, a straight passage 10 that extends linearly from the inlet 8 to make the intake air flow straight in the same direction as the intake air mainstream in the intake passage 2, and a circulation passage 11 that makes flow around the intake air flowing straight through the straight passage 10 to divert the air into the outlet 9. Accordingly, a passage length L2 of the bypass flow passage 4 is longer than a passage length L1 in a case where the air is not taken into the bypass flow passage 4 and flows straight through the intake passage 2.

A dust discharge passage 12 for discharging dust is connected linearly to the straight passage 10. A downstream end of the dust discharge passage 12 serves as a dust discharge port 13 that opens into the intake passage 2 toward a downstream side of the intake air mainstream. The sensor chip 6 projects at a position that is located on the most rear side of the circulation passage 11 and the farthest from the straight passage 10. The circulation passage 11 branches into two passages on the downstream side, and the two outlets 9 are thereby provided. In addition, at the position of the circulation passage 11 at which the sensor chip 6 is arranged, the flow of air is opposite from the flow in the straight passage 10 and the flow of the intake air mainstream in the intake passage 2.

As described above, the air flow measuring device 1 is not influenced directly by the turbulence of the intake air mainstream in the intake passage 2 by arranging the sensor chip 6 in the bypass flow passage 4 instead of disposing the sensor chip 6 directly in the intake passage 2, through which the intake air mainstream passes, so as to output the measurement value with few variations. The air flow measuring device 1 sets an increase range of the measurement value in accordance with a value of L2/L1 (first adjustment amount) by making longer the passage length L2 than the passage length L1 by means of the circulation passage 11 and so forth so as to resolve a reduction of the measured value caused as a result of measurement of a flow rate of a flow with pulsation.

Characteristics of the air flow measuring device 1 of the first embodiment will be described with reference to FIGS. 1 to 2B. In the air flow measuring device 1, a throttle 15 is provided on an outer wall surface of the housing 5. The throttle 15 merges a bypass-passing flow out of the outlet 9 through the bypass flow passage 4, and an outside-passing flow along the outer wall surface of the housing 5 in a direction of the intake air mainstream without flowing through the bypass flow passage 4 and guides the merging flow to the downstream side of the intake air mainstream with the flow narrowed.

The throttle 15 includes two curved raised portions 17 raised from the outer wall surface of the housing 5 to sandwich the outlet 9, the outer wall surface of the housing 5, and a cover 19 that bridges between the two raised portions 17 and is opposed to the outer wall surface of the housing 5. Parts of the two raised portions 17 on the upstream side of the outlet 9 in the intake air mainstream flow direction are provided linearly as well as parallel to the intake air mainstream. Parts of the two raised portions 17 on the downstream side of the outlet 9 in the intake air mainstream flow direction are swollen and curved in a projecting manner outward of the throttle 15 and come closer to each other on the downstream side.

The cover 19 includes an inner surface 20 exposed to the throttle 15 and an outer surface 21 exposed to the outside of the throttle 15. A peripheral edge of the cover 19 is formed in a shape that is in conformity to respective ridgelines of the two raised portions 17, and includes two contact edges 23 in contact with the respective ridgelines, an upstream edge 24 that separates off (defines) the outer surface 21 on the upstream side in the intake air mainstream flow direction and serves as an inlet of the throttle 15, and a downstream edge 25 that separates off (defines) the outer surface 21 on the downstream side in the intake air mainstream flow direction and serves as an outlet of the throttle 15.

A region α of the outer surface 21 that spreads from the upstream edge 24 to the downstream side in the intake air mainstream flow direction is swollen outward further in a shape of a projecting curved surface on the downstream side. A region β of the outer surface 21 that spreads on the downstream side of the region α in the intake air mainstream flow direction is generally parallel to the outer wall surface of the housing 5.

Effects of the air flow measuring device 1 of the first embodiment will be described. In the device 1 of the first embodiment, there is provided the throttle 15 that merges the bypass-passing flow out of the outlet 9 through the bypass flow passage 4, and the outside-passing flow along the outer wall surface of the housing 5 in the direction of the intake air mainstream without flowing through the bypass flow passage 4 and guides the merging flow to the downstream side of the intake air mainstream with the flow narrowed.

Accordingly, although its mechanism is not clear, the first adjustment amount is reduced in accordance with a fluctuation range of the flow rate from an error eliminable range to a smaller-side (reduction range of the first adjustment amount by the throttle 15 is hereinafter referred to as a second adjustment amount). As a result, in the case of measurement of the amount of intake air into the engine by the thermal-type air flow measuring device 1, even if the intake air amount changes from the error eliminable range to the smaller-side, generation of a positive-side error can be curbed.

The region α of the outer surface 21 of the cover 19 including the upstream edge 24 is formed to be swollen outward further in a shape of a projecting curved surface on the downstream side. Accordingly, exfoliation of the flow of intake air along the outer surface 21 of the cover 19 from the outer surface 21 can be limited. For this reason, a drift characteristic of the air flow measuring device 1 can be improved, and a pressure loss of the intake air mainstream can be reduced.

(Second Embodiment)

Figure 3A:
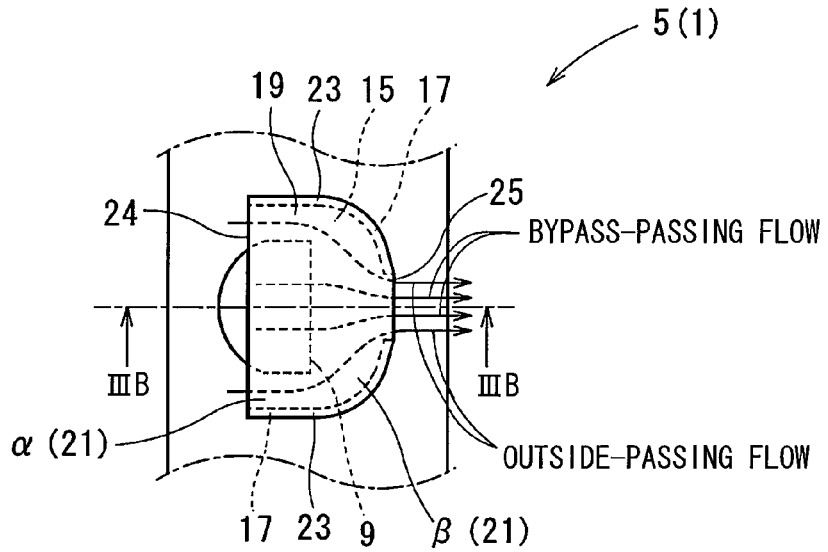
FIG. 3A is a partial side view illustrating an air flow measuring device in accordance with a second embodiment.
Figure 3B:
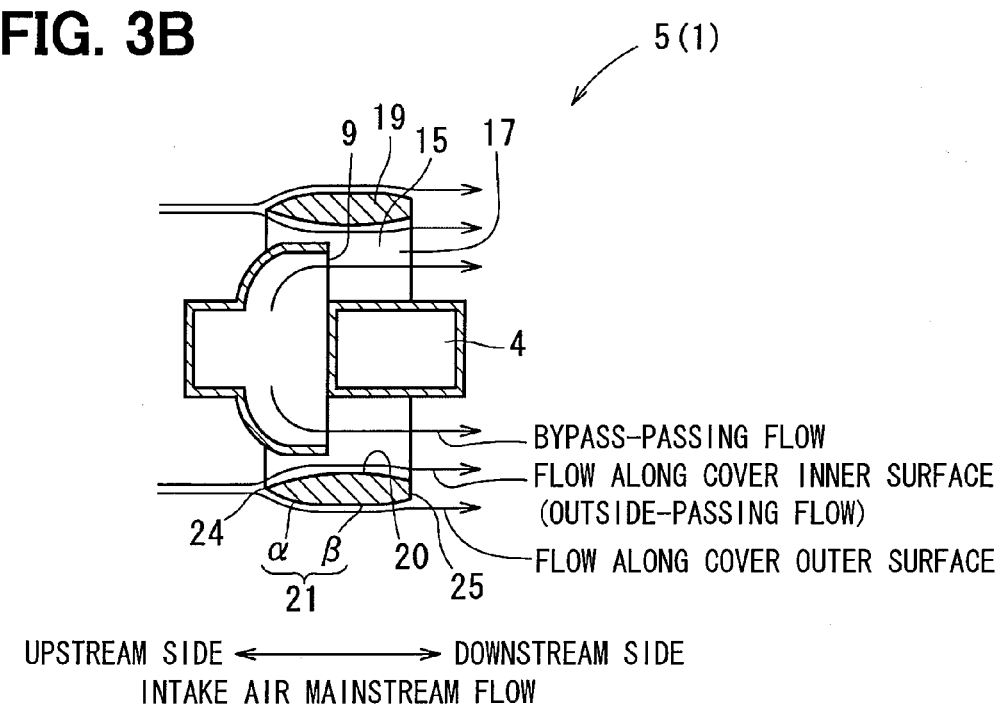
FIG. 3B is a sectional view taken along a line IIIB-IIIB in FIG. 3A.

In an air flow measuring device 1 of the second embodiment, as illustrated in FIGS. 3A and 3B, inner and outer surfaces 20, 21 of a cover 19 are both separated off (defined) on the upstream side in the intake air mainstream flow by an upstream edge 24. The outer surface 21 is swollen outward in a shape of a projecting curved surface, and the inner surface 20 is swollen on a throttle 15-side in a shape of a projecting curved surface. Accordingly, exfoliation of the flows of intake air along both the inner and outer surfaces 20, 21 of the cover 19 from their respective surfaces can be limited. More specifically, the exfoliation of not only the flow of intake air along the outer surface 21 of the cover 19 but also of the flow of intake air of the outside-passing flow along the inner surface 20 of the cover 19 from the inner surface 20 can be limited. For this reason, a drift characteristic of the air flow measuring device 1 can be further improved, and a pressure loss of the intake air mainstream can be further reduced.

(Third Embodiment)

Figure 4A:
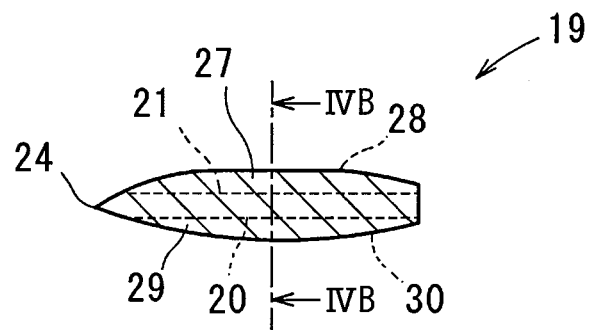
FIG. 4A is a sectional view of a cover parallel to an intake air mainstream in accordance with a third embodiment.
Figure 4B:
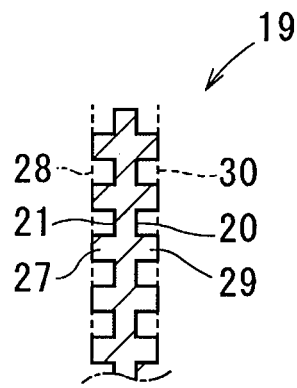
FIG. 4B is a cross-sectional view taken along a line IVB-IVB in FIG. 4A.

In an air flow measuring device 1 of the third embodiment, as illustrated in FIGS. 4A and 4B, outer ribs 27 that are generally parallel to the intake air mainstream are provided on an outer surface 21 of a cover 19. Ridgelines of the outer ribs 27 and an upstream edge 24 are formed to be included in one imaginary projecting curved surface 28 that is swollen outward of a throttle 15. The projecting curved surface 28 is swollen outward in a shape of a projecting curved surface.

Moreover, inner ribs 29 that are generally parallel to the intake air mainstream are provided also on an inner surface 20. Ridgelines of the inner ribs 29 and the upstream edge 24 are provided to be included in another imaginary projecting curved surface 30 that is swollen on the throttle 15-side. The projecting curved surface 30 is swollen on the throttle 15-side in a shape of a projecting curved surface.

Accordingly, separation of flows along the outer surface 21, surfaces of the outer ribs 27, the ridgelines of the outer ribs 27, and so forth can be limited outside the throttle 15. Similarly, separation of flows along the inner surface 20, surfaces of the inner ribs 29, the ridgelines of the inner ribs 29 and so forth can be limited also on the throttle 15-side. For this reason, a drift characteristic of the air flow measuring device 1 can be improved, and a pressure loss of the intake air mainstream can be reduced.

In the case of formation of the cover 19 by injection molding, its dimensional accuracy decreases as the cover 19 becomes thicker. Accordingly, the outer and inner ribs 27, 29 are provided respectively outside the cover 19 and on the throttle 15-side, and the cover 19 is constituted of thin portions. As a result, the cover 19 having high dimensional accuracy can be provided.

(Fourth Embodiment)

Figure 5A:
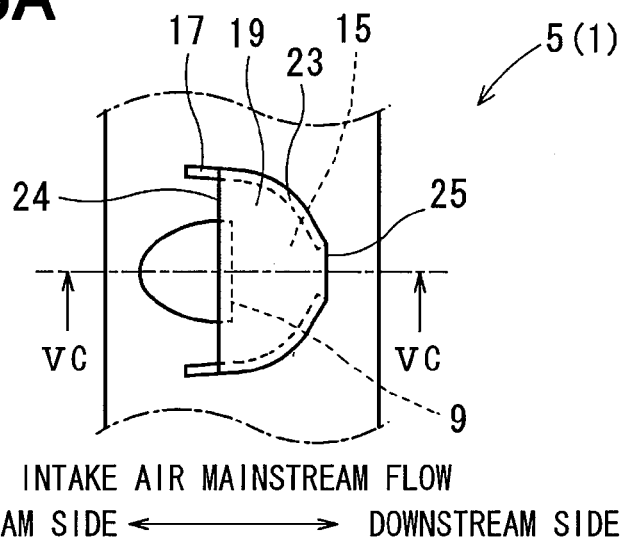
FIG. 5A is a partial side view illustrating an air flow measuring device in accordance with a fourth embodiment.
Figure 5B:
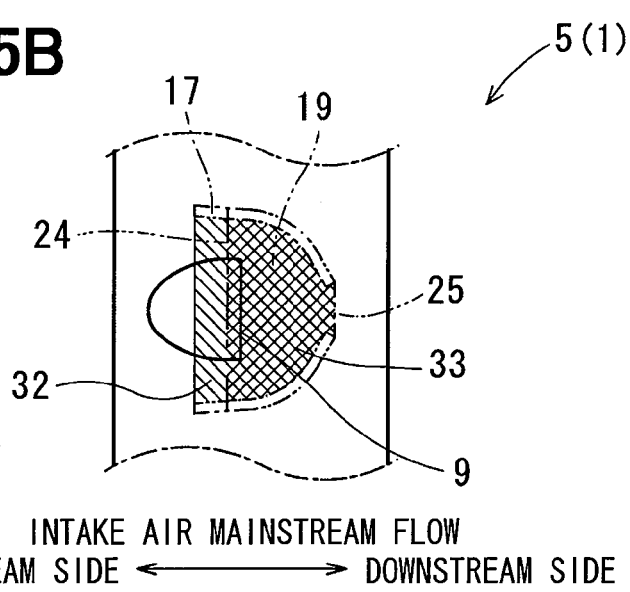
FIG. 5B is a diagram illustrating a narrow range and an opposing range according to the fourth embodiment.
Figure 5C:
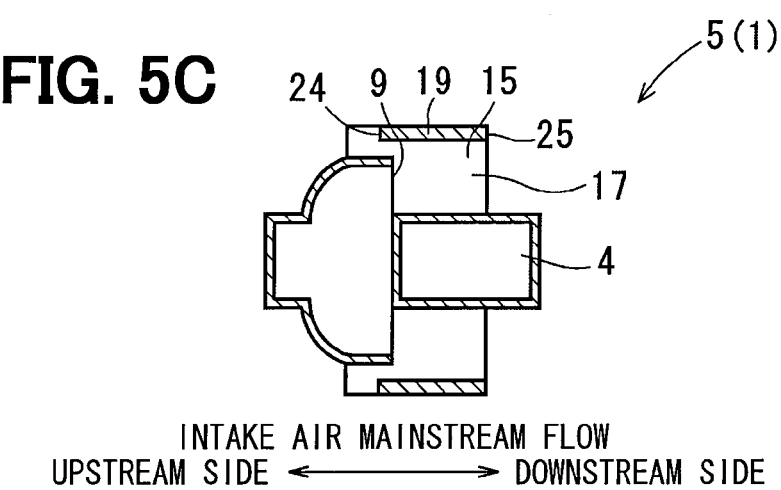
FIG. 5C is a sectional view taken along a line VC-VC in FIG. 5A.

Configuration of an air flow rate measuring device 1 of the fourth embodiment will be described. In the device 1 of the fourth embodiment, as illustrated in FIGS. 5A to 5C, a cover 19 is not opposed to the entire narrow range 32 formed on an outer wall surface of a housing 5, and is opposed partly to the range 32. The cover 19 defines an opposing range 33 in the narrow range 32. The narrow range 32 is a region of the outer wall surface of the housing 5 located between root parts of two raised portions 17, and is indicated by hatching with diagonally right-down oblique lines. The opposing range 33 is a region of the narrow range 32 opposed to and covered by the cover 19 from the outside and is indicated as a region in which hatching with diagonally right-down oblique lines and hatching with diagonally left-down oblique lines overlap.

By advancing an upstream edge 24 on the downstream side from a line segment connecting together upstream ends of ridgelines of the two raised portions 17, the cover 19 is not opposed to the entire narrow range 32, and is opposed to a downstream-sided part of the narrow range 32 thereby to define the opposing range 33. The cover 19 is in contact with downstream-sided parts of the ridgelines of the two raised portions 17. The upstream edge 24 is provided perpendicular to the intake air mainstream, and the edge 24 can be seen as a line segment separated (defined) by the two raised portions 17 when viewed from the lateral side.

Effects of the air flow measuring device 1 of the fourth embodiment will be described. In the device 1 of the fourth embodiment, the cover 19 is not opposed to the entire narrow range 32 and is opposed partly to the range 32 thereby to define the opposing range 33. Accordingly, the shape of the cover 19 can be changed in such a manner that the cover 19 is not opposed to the entire narrow range 32. For this reason, the flow-narrowing manner through a throttle 15 can be changed freely. As a result, no matter how the smaller-side use value of the intake air amount changes on the smaller-side from the error eliminable range, generation of a positive-side error can be limited through the regulation of the second adjustment amount.

More specifically, when the flow-narrowing manner is undue in the throttle 15, the second adjustment amount becomes excessive, and in the case of the intake air amount being on the smaller-side of the error eliminable range, a negative-side error is highly likely to be produced. Conversely, when the flow-narrowing manner is too little in the throttle 15, the second adjustment amount becomes excessively small, and in the case of the intake air amount being on the smaller-side of the error eliminable range, the positive-side error is highly likely to be produced. Accordingly, by changing the shape of the cover 19 according to the smaller-side use value of the intake air amount, the flow-narrowing manner through the throttle 15 is adjusted. As a result, the second adjustment amount can be set not to be excessively large or excessively small.

In addition, by advancing the upstream edge 24 on the downstream side, the cover 19 is not opposed to the entire narrow range 32 and is opposed only to the downstream side region of the narrow range 32. Accordingly, a part of the flow of air flowing into the throttle 15 is directed outside the throttle 15 in a state where it is not narrowed very much. A ratio between the flow toward the outside of the throttle 15 and the flow continuously passing through the throttle 15 is determined by an advancing width of the upstream edge 24. For this reason, by changing the advancing width of the upstream edge 24, the flow-narrowing manner through the throttle 15 can be easily adjusted. Consequently, the second adjustment amount can be regulated easily.

(Fifth Embodiment)

Figure 6A:
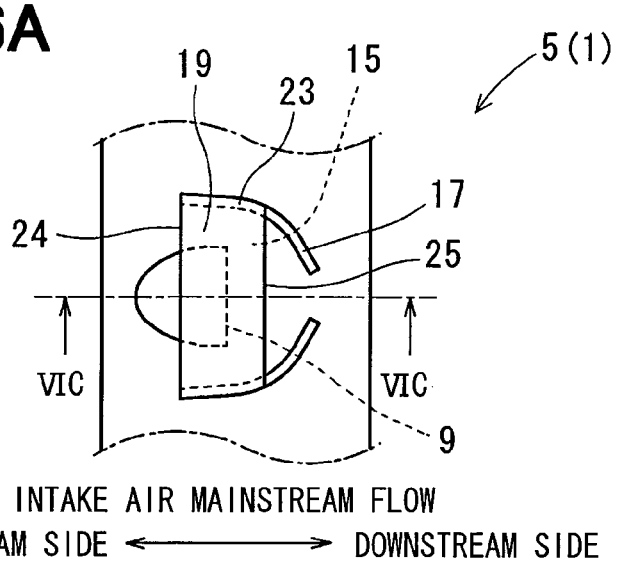
FIG. 6A is a partial side view illustrating an air flow measuring device in accordance with a fifth embodiment.
Figure 6B:
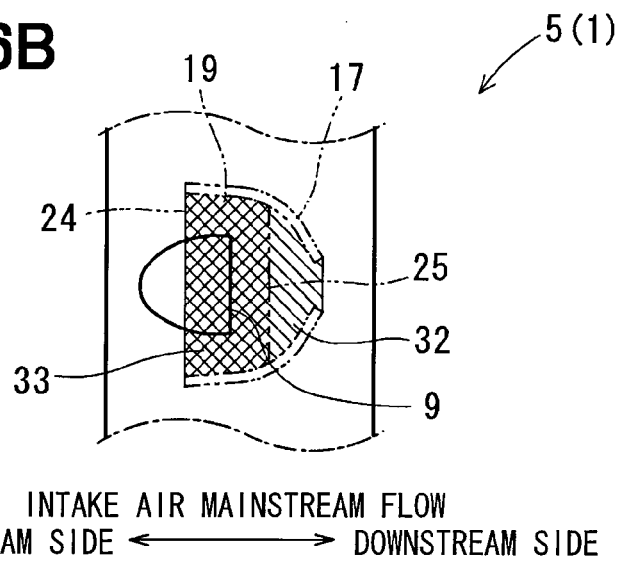
FIG. 6B is a diagram illustrating a narrow range and an opposing range according to the fifth embodiment.
Figure 6C:
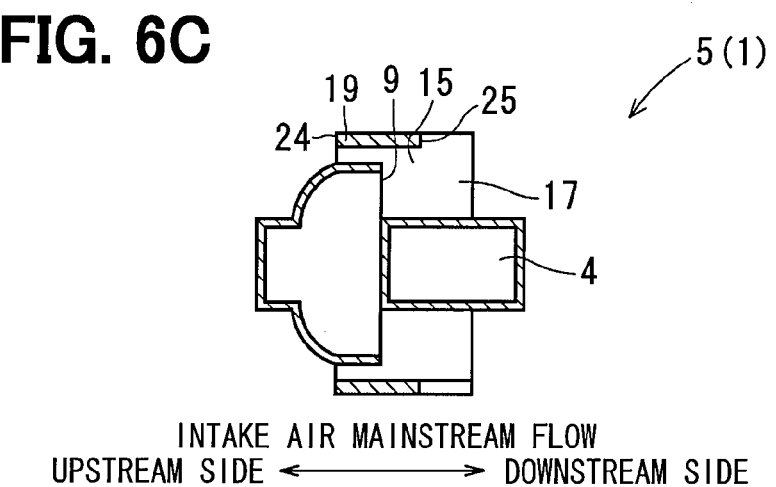
FIG. 6C is a sectional view taken along a line VIC-VIC in FIG. 6A.

In an air flow measuring device 1 of the fifth embodiment, a cover 19 is not opposed to the entire narrow range 32 by advancing a downstream edge 25 on the upstream side as illustrated in FIGS. 6A to 6C, and the cover 19 is opposed to an upstream-sided part of the narrow range 32 thereby to define an opposing range 33. Accordingly, by making recede the downstream edge 25 instead of advancing an upstream edge 24, the flow-narrowing manner through a throttle 15 is adjusted so that the second adjustment amount can be regulated. For this reason, options can be increased for a shape of the cover 19 necessary to obtain the same second adjustment amount. The downstream edge 25 is provided perpendicular to the intake air mainstream, and the edge 25 can be seen as a line segment separated (defined) by the two raised portions 17 when viewed from the lateral side.

(Sixth Embodiment)

Figure 7A:
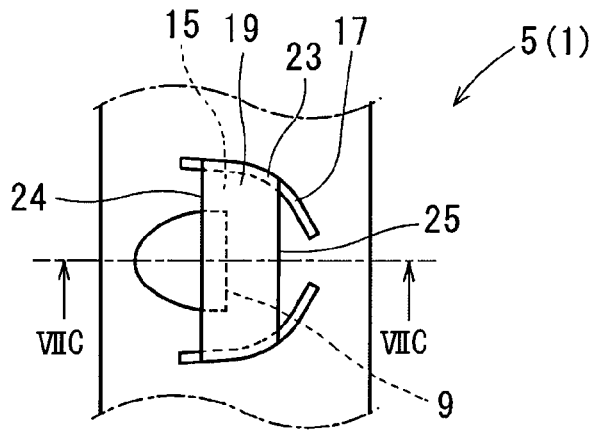
FIG. 7A is a partial side view illustrating an air flow measuring device in accordance with a sixth embodiment.
Figure 7B:
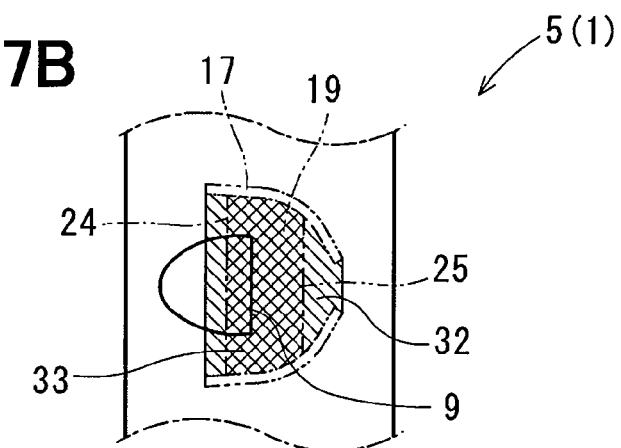
FIG. 7B is a diagram illustrating a narrow range and an opposing range according to the sixth embodiment.
Figure 7C:
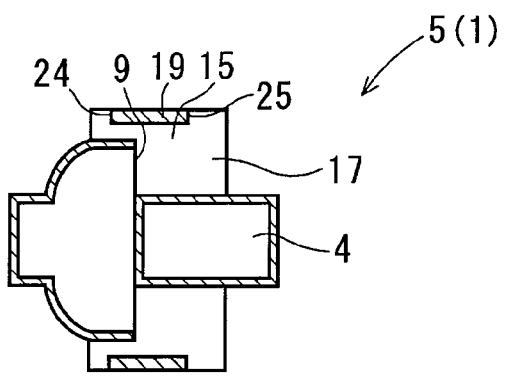
FIG. 7C is a sectional view taken along a line VIIC-VIIC in FIG. 7A.

In an air flow measuring device 1 of a sixth embodiment, a cover 19 is not opposed to the entire narrow range 32 by making recede an upstream edge 24 on the downstream side and by making recede a downstream edge 25 on the upstream side as illustrated in FIGS. 7A to 7C, and the cover 19 is opposed to a middle region of the narrow range 32 thereby to define an opposing range 33. In addition, the cover 19 is in contact with intermediate parts of ridgelines of two raised portions 17 between their upstream ends and downstream ends.

Accordingly, by advancing the upstream edge 24 and by making recede the downstream edge 25, the flow-narrowing manner through a throttle 15 is adjusted so that the second adjustment amount can be regulated. For this reason, options can be further increased for a shape of the cover 19 necessary to obtain the same second adjustment amount. In addition, the upstream edge 24 and the downstream edge 25 are provided perpendicular to the intake air mainstream, and the edges 24, 25 can be seen as a line segment separated (defined) by the two raised portions 17 when viewed from the lateral side.

(Seventh Embodiment)

Figure 8A:
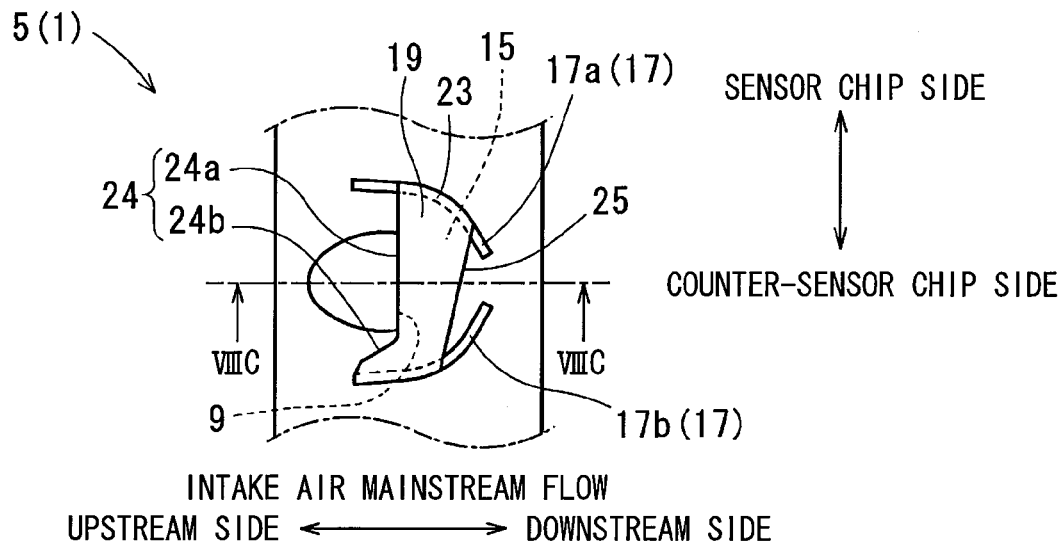
FIG. 8A is a partial side view illustrating an air flow measuring device in accordance with a seventh embodiment.
Figure 8B:
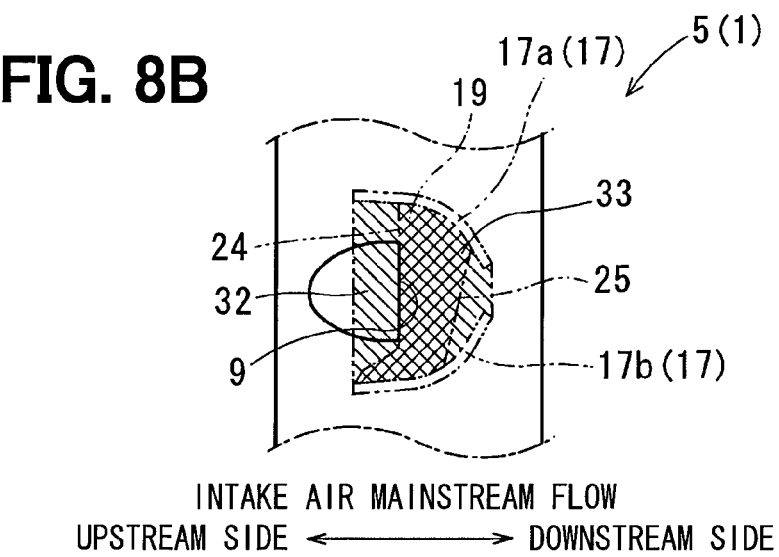
FIG. 8B is a diagram illustrating a narrow range and an opposing range according to the seventh embodiment.
Figure 8C:
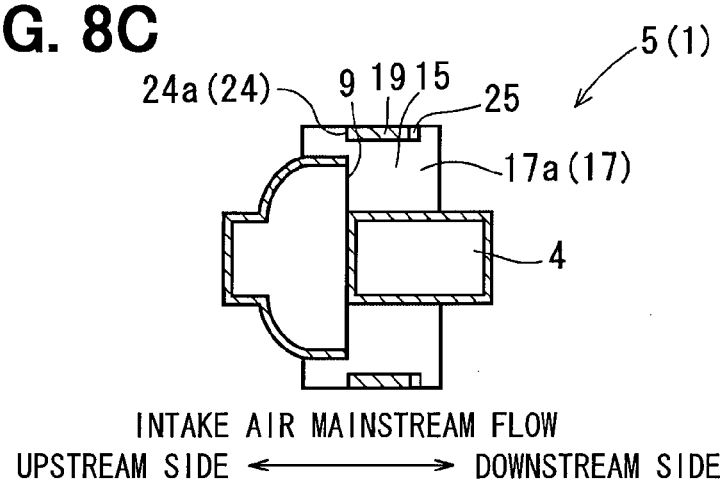
FIG. 8C is a sectional view taken along a line VIIIC-VIIIC in FIG. 8A.

Configuration of an air flow measuring device 1 of a seventh embodiment will be described with reference to FIGS. 8A to 8C. A raised portion 17 of two raised portions 17 on a sensor chip 6-side is referred to as a raised portion 17a, and a raised portion 17 on the opposite side from the sensor chip 6 is referred to as a raised portion 17b. In FIGS. 8A to 8C, an upstream edge 24 includes an upright portion 24a that is perpendicular to the intake air mainstream when viewed from the lateral side and is receded on the downstream side, and a non-upright portion 24b connecting together an upstream end of a ridgeline of the raised portion 17b and the upright portion 24a. The sensor chip 6-side of the upright portion 24a is separated (defined) by the raised portion 17a.

A downstream edge 25 can be seen as a line segment separated (defined) by the two raised portions 17 when viewed from the lateral side, and the edge 25 is inclined from a direction perpendicular to the intake air mainstream to advance more on the downstream side further on the sensor chip 6-side. Accordingly, options can be further increased for a shape of the cover 19 necessary to obtain the same second adjustment amount.

The mode of the air flow measuring device 1 is not limited to the first to seventh embodiments, and various modifications may be made to the mode of the device 1. For example, in the device 1 of the first embodiment, the region a of the outer surface 21 including the upstream edge 24 is swollen outward in a shape of a projecting curved surface, and in the air flow measuring device 1 of the second embodiment, the whole surfaces of both the inner and outer surfaces 20, 21 are swollen in a shape of a projecting curved surface. Alternatively, in the device 1 of the first embodiment, the entire outer surface 21 may be swollen in a shape of a projecting curved surface, or in the air flow measuring device 1 of the second embodiment, a region of one or both of the inner and outer surfaces 20, 21 including the upstream edge 24 may be swollen in a shape of a projecting curved surface.

In the air flow measuring device 1 of the third embodiment, the whole surfaces of the imaginary projecting curved surfaces 28, 30 are swollen respectively outward and on the throttle 15-side. Alternatively, a region of one or both of the projecting curved surfaces 28, 30 including the upstream edge 24 may be swollen in a shape of a projecting curved surface. Furthermore, the outer ribs 27 may be provided only on the outer surface 21 without providing the inner ribs 29 on the inner surface 20. In the air flow measuring device 1 of the first to third embodiments, the sensor for detection of the intake air amount is configured as the sensor chip 6. However, instead of the sensor chip 6, the sensor may be configured, for example, using a bobbin obtained by winding a platinum wire.

Figure 9A:
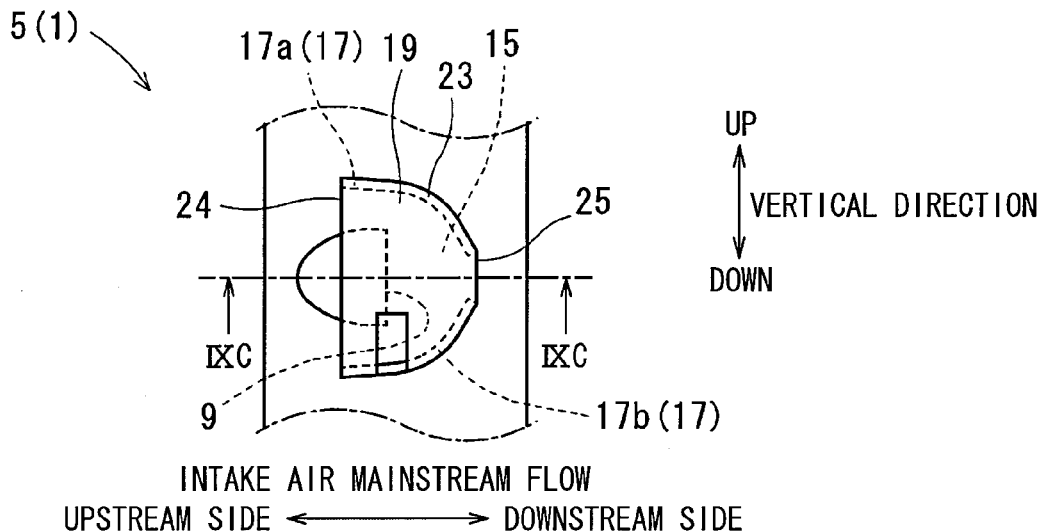
FIG. 9A is a partial side view illustrating an air flow measuring device in accordance with a first modification.
Figure 9B:
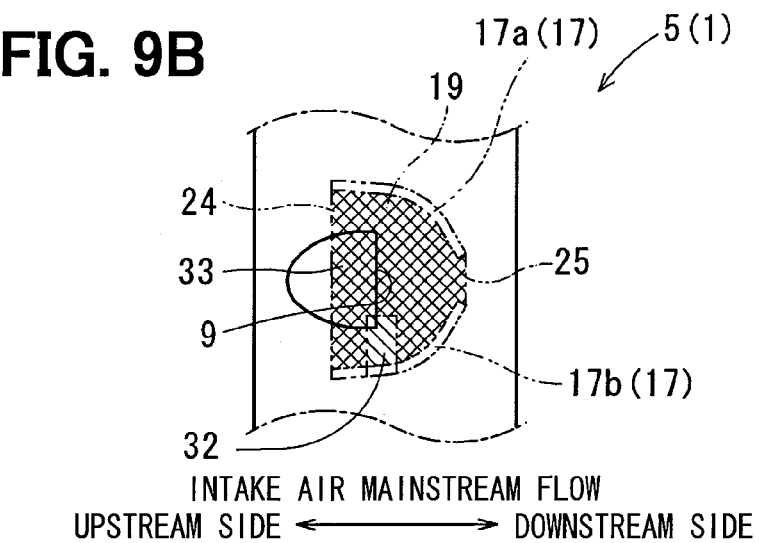
FIG. 9B is a diagram illustrating a narrow range and an opposing range according to the first modification.
Figure 9C:
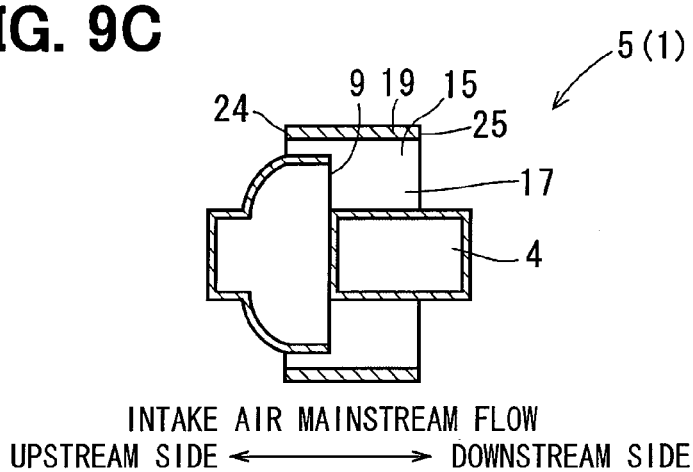
FIG. 9C is a sectional view taken along a line IXC-IXC in FIG. 9A.
Figure 10A:
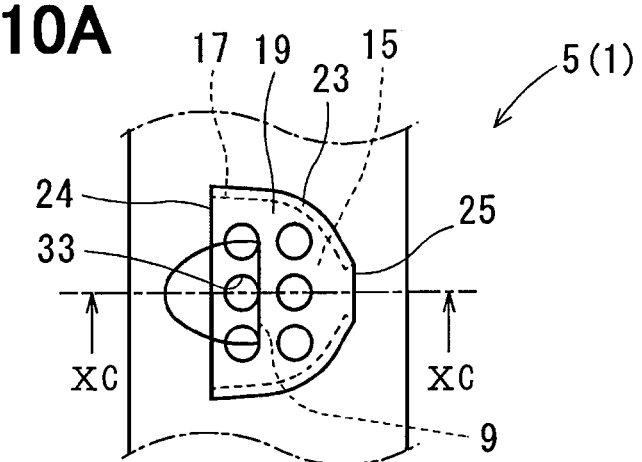
FIG. 10A is a partial side view illustrating an air flow measuring device in accordance with a second modification.
Figure 10B:
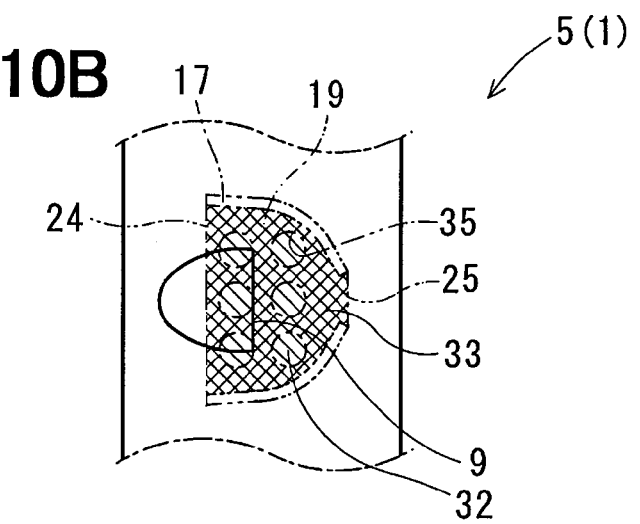
FIG. 10B is a diagram illustrating a narrow range and an opposing range according to the second modification.
Figure 10C:
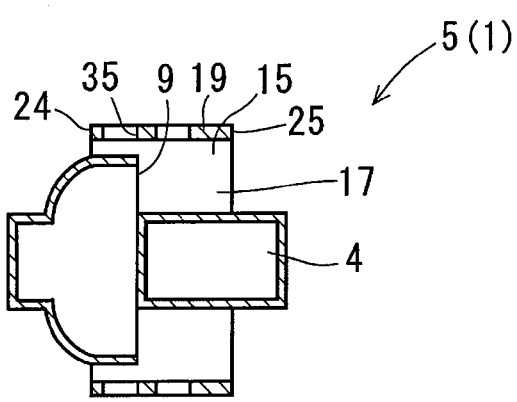
FIG. 10C is a sectional view taken along a line XC-XC in FIG. 10A.

In the air flow measuring device 1 of the first to seventh embodiments, the vertical direction is not particularly specified. For example, as illustrated in FIGS. 9A to 9C, the raised portion 17b may be provided on a lower side of the raised portion 17a in the vertical direction, and by providing the cover 19 partly not to span the ridgeline of the raised portion 17b, the second adjustment amount can be set up in a mode to draw water from the throttle 15. In addition, as illustrated in FIGS. 10A to 10C, the opposing range 33 may be set by forming a hole 35 passing through the cover 19. In this case, the second adjustment amount can be set without shortening a joining length of the cover 19 and the raised portion 17. Accordingly, the possibility that the cover 19 is removed from the raised portion 17 can be decreased.

To sum up, the air flow measuring device 1 of the above embodiments can be described as follows.

An air flow measuring device 1 is adapted to be disposed in an intake passage 2 through which intake air drawn into an internal combustion engine flows and is configured to take in a part of intake air flowing through the intake passage 2 and to produce an electrical signal which is in accordance with a flow rate of intake air in the intake passage 2. The air flow measuring device 1 includes a housing 5, a sensor 6, and a throttle 15. The housing 5 defines a bypass flow passage 4 through which the taken-in intake air passes. The sensor 6 is accommodated in the bypass flow passage 4 and is configured to generate the electrical signal as a result of heat transfer between the taken-in intake air and the sensor 6. The throttle 15 is provided on an outer wall surface of the housing 5 and is configured to merge together a bypass-passing flow out of an outlet 9 of the bypass flow passage 4 via the bypass flow passage 4 and an outside-passing flow in a flow direction of intake air in the intake passage 2 along the outer wall surface of the housing 5 without passing through the bypass flow passage 4 and to guide the merged flow toward a downstream side in the flow direction of intake air in the intake passage 2 with the merged flow narrowed. The throttle 15 includes two raised portions 17 and a cover 19. The two raised portions 17 are raised from the outer wall surface of the housing 5 with the outlet 9 located therebetween. The cover 19 bridges between the two raised portions 17 and is opposed to the outer wall surface of the housing 5. The cover 19 includes an inner surface 20 exposed to the throttle 15, and an outer surface 21 exposed to outside of the throttle 15. A peripheral border of the cover 19 includes an upstream edge 24 which defines the outer surface 21 on an upstream side in the flow direction of intake air in the intake passage 2. At least a region α of the outer surface 21 including the upstream edge 24 is swollen more outwardly in a shape of a projecting curved surface further on the downstream side in the flow direction of intake air in the intake passage 2.

By providing the throttle 15 that merges together the bypass-passing flow and outside-passing flow and guides the flow to the downstream side with the flow narrowed, the increase range due to L2/L1 (first adjustment amount) is reduced in accordance with a fluctuation range of the intake air amount from the error eliminable range to the smaller-side, although its mechanism is not clear (reduction range of the first adjustment amount by the throttle 15 is hereinafter referred to as the second adjustment amount). As a result, in the case of measurement of the amount of intake air with pulsation by the thermal-type air flow measuring device 1, even if the intake air amount changes from the error eliminable range to the smaller-side, generation of a positive-side error can be curbed.

By providing the region α of the outer surface 21 including the upstream edge 24 to be swollen more outward in a shape of a projecting curved surface further on the downstream side, the exfoliation of the flow of intake air along the outer surface 21 of the cover 19 from the outer surface 21 can be limited. For this reason, a drift characteristic of the air flow measuring device 1 can be improved, and a pressure loss of intake air in the intake passage 2 can be reduced.

The inner surface 20 may be defined by the upstream edge 24 on the upstream side in the flow direction of intake air in the intake passage 2. At least a region of the inner surface 20 including the upstream edge 24 may be swollen more toward the throttle 15 in a shape of a projecting curved surface further on the downstream side in the flow direction of intake air in the intake passage 2. Accordingly, exfoliation of the flow of intake air along the inner surface 20 of the cover 19 from the inner surface 20 can be limited. For this reason, a drift characteristic of the air flow measuring device 1 can be further improved, and a pressure loss of intake air in the intake passage 2 can be further reduced.

An air flow measuring device 1 is adapted to be disposed in an intake passage 2 through which intake air drawn into an internal combustion engine flows and is configured to take in a part of intake air flowing through the intake passage 2 and to produce an electrical signal which is in accordance with a flow rate of intake air in the intake passage 2. The air flow measuring device 1 includes a housing 5, a sensor 6, and a throttle 15. The housing 5 defines a bypass flow passage 4 through which the taken-in intake air passes. The sensor 6 is accommodated in the bypass flow passage 4 and is configured to generate the electrical signal as a result of heat transfer between the taken-in intake air and the sensor 6. The throttle 15 is provided on an outer wall surface of the housing 5 and is configured to merge together a bypass-passing flow out of an outlet 9 of the bypass flow passage 4 via the bypass flow passage 4 and an outside-passing flow in a flow direction of intake air in the intake passage 2 along the outer wall surface of the housing 5 without passing through the bypass flow passage 4 and to guide the merged flow toward a downstream side in the flow direction of intake air in the intake passage 2 with the merged flow narrowed. The throttle 15 includes two raised portions 17 and a cover 19. The two raised portions 17 are raised from the outer wall surface of the housing 5 with the outlet 9 located therebetween. The cover 19 bridges between the two raised portions 17 and is opposed to the outer wall surface of the housing 5. The cover 19 includes an inner surface 20 exposed to the throttle 15, and an outer surface 21 exposed to outside of the throttle 15. A peripheral border of the cover 19 includes an upstream edge 24 which defines the outer surface 21 on an upstream side in the flow direction of intake air in the intake passage 2. The outer surface 21 includes a plurality of outer ribs 27 that are not perpendicular to the flow direction of intake air in the intake passage 2. Ridge lines of the plurality of outer ribs 27 and the upstream edge 24 are formed to be included in an imaginary projecting curved surface 28 that is swollen outward of the throttle 15. At least a region of the imaginary projecting curved surface 28 including the upstream edge 24 is swollen more outwardly in a shape of a projecting curved surface further on the downstream side in the flow direction of intake air in the intake passage 2.

By providing the throttle 15 that merges together the bypass-passing flow and outside-passing flow and guides the flow to the downstream side with the flow narrowed, in the case of measurement of the amount of intake air with pulsation by the thermal-type air flow measuring device 1, even if the intake air amount changes from the error eliminable range to the smaller-side, generation of a positive-side error can be curbed.

The outer ribs 27 are provided on the outer surface 21, and the ridgelines of the outer ribs 27 are included in one projecting curved surface, so that the separation of flows along the outer surface 21, surfaces of the outer ribs 27, the ridgelines of the outer ribs 27, and so forth can be limited outside the throttle 15. For this reason, a drift characteristic of the air flow measuring device 1 can be improved, and a pressure loss of intake air in the intake passage 2 can be reduced.

In the case of formation of the cover 19 by injection molding, its dimensional accuracy decreases as the cover 19 becomes thicker. Accordingly, the outer ribs 27 are provided outside the cover 19, and the cover 19 is constituted of thin portions. As a result, the cover 19 having high dimensional accuracy can be provided.

The inner surface 20 may include a plurality of inner ribs 29 that are not perpendicular to the flow direction of intake air in the intake passage 2. Ridge lines of the plurality of inner ribs 29 and the upstream edge 24 may be formed to be included in another imaginary projecting curved surface 30 that is swollen toward the throttle 15. At least a region of the another imaginary projecting curved surface 30 including the upstream edge 24 may be swollen more toward the throttle 15 in a shape of a projecting curved surface further on the downstream side in the flow direction of intake air in the intake passage 2.

Accordingly, because the flow separation is curbed also on the throttle 15-side, a drift characteristic of the air flow measuring device 1 can be further improved, and a pressure loss of intake air in the intake passage 2 can be further reduced. Moreover, the cover 19 can be constituted of even thinner portions. As a result, the cover 19 having higher dimensional accuracy can be provided.

The cover 19 is not opposed to all of a narrow range 32 of the outer wall surface of the housing 5 located between root parts of the two raised portions 17, and is opposed partly to the narrow range 32. Accordingly, the shape of the cover 19 can be changed in such a manner that the cover 19 is not opposed to the entire narrow range 32. For this reason, the flow-narrowing manner through a throttle 15 can be changed freely. As a result, no matter how the smaller-side use value of the intake air amount changes on the smaller-side from the error eliminable range, generation of a positive-side error can be limited through the regulation of the second adjustment amount.

More specifically, when the flow-narrowing manner is undue in the throttle 15, the second adjustment amount becomes excessive, and in the case of the intake air amount being on the smaller-side of the error eliminable range, a negative-side error is highly likely to be produced. Conversely, when the flow-narrowing manner is too little in the throttle 15, the second adjustment amount becomes excessively small, and in the case of the intake air amount being on the smaller-side of the error eliminable range, the positive-side error is highly likely to be produced. Accordingly, by changing the shape of the cover 19 according to the smaller-side use value of the intake air amount, the flow-narrowing manner through the throttle 15 is adjusted. As a result, the second adjustment amount can be set not to be excessively large or excessively small.

At least a part of an upstream edge 24 of the cover 19 that defines an upstream side of the cover 19 in the flow direction of intake air may be advanced on the downstream side from a line segment that connects together upstream ends of ridge lines of the two raised portions 17 in the flow direction of intake air. Consequently, at least a part of the narrow range 32 that continues from the upstream end to the downstream side is not covered by the cover 19. Accordingly, a part of the flow of air flowing into the throttle 15 is directed outside the throttle 15 in a state where it is not narrowed very much. A ratio between the flow toward the outside of the throttle 15 and the flow continuously passing through the throttle 15 is determined by an advancing mode of the upstream edge 24. For this reason, by changing the advancing mode of the upstream edge 24, the flow-narrowing manner through the throttle 15 can be easily adjusted. Consequently, the second adjustment amount can be regulated easily.

At least a part of a downstream edge 25 of the cover 19 that defines a downstream side of the cover 19 in the flow direction of intake air may be receded on an upstream side from a line segment that connects together downstream ends of ridge lines of the two raised portions 17 in the flow direction of intake air. Accordingly, by making recede the downstream edge 25 without advancing the upstream edge 24, or by advancing the upstream edge 24 as well as making recede the downstream edge 25, the flow-narrowing manner through the throttle 15 is adjusted, and the second adjustment amount can be regulated. For this reason, options can be increased for a shape of the cover 19 necessary to obtain the same second adjustment amount.

One raised portion 17b of the two raised portions 17 may be located on a lower side of the other raised portion 17a of the two raised portions 17 in a vertical direction of the device 1. The cover 19 partly may not span a ridgeline of the one raised portion 17b. Accordingly, the second adjustment amount can be set up in a mode to draw water from the throttle 15.

The cover 19 may include a hole 35 that passes through the cover 19. Accordingly, the second adjustment amount can be set without shortening the joining length of the cover 19 and the ridgeline of the raised portion 17. Therefore, the possibility that the cover 19 is removed from the raised portion 17 can be decreased.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device that is adapted to be disposed in an intake passage through which intake air drawn into an internal combustion engine flows and that is configured to take in a part of intake air flowing through the intake passage and to produce an electrical signal which is in accordance with a flow rate of intake air in the intake passage, the air flow measuring device comprising:

a housing that defines a bypass flow passage through which the taken-in intake air passes;

a sensor that is accommodated in the bypass flow passage and is configured to generate the electrical signal as a result of heat transfer between the taken-in intake air and the sensor; and a throttle that is provided on an outer wall surface of the housing and is configured to merge together a bypass-passing flow out of an outlet of the bypass flow passage via the bypass flow passage and an outside-passing flow in a flow direction of intake air in the intake passage along the outer wall surface of the housing without passing through the bypass flow passage and to guide the merged flow toward a downstream side in the flow direction of intake air in the intake passage with the merged flow narrowed, the throttle including:

two raised portions that are raised from the outer wall surface of the housing with the outlet located therebetween; and a cover that bridges between the two raised portions and is opposed to the outer wall surface of the housing, wherein:

the cover includes an inner surface exposed to the throttle, and an outer surface exposed to outside of the throttle;

a peripheral border of the cover includes an upstream edge which defines the outer surface on an upstream side in the flow direction of intake air in the intake passage; and at least a region of the outer surface including the upstream edge is swollen more outwardly in a shape of a projecting curved surface further on the downstream side in the flow direction of intake air in the intake passage.

2. The air flow measuring device according to claim 1, wherein:

the inner surface is defined by the upstream edge on the upstream side in the flow direction of intake air in the intake passage; and at least a region of the inner surface including the upstream edge is swollen more toward the throttle in a shape of a projecting curved surface further on the downstream side in the flow direction of intake air in the intake passage.

3. An air flow measuring device that is adapted to be disposed in an intake passage through which intake air drawn into an internal combustion engine flows and that is configured to take in a part of intake air flowing through the intake passage and to produce an electrical signal which is in accordance with a flow rate of intake air in the intake passage, the air flow measuring device comprising:

a housing that defines a bypass flow passage through which the taken-in intake air passes;

a sensor that is accommodated in the bypass flow passage and is configured to generate the electrical signal as a result of heat transfer between the taken-in intake air and the sensor; and a throttle that is provided on an outer wall surface of the housing and is configured to merge together a bypass-passing flow out of an outlet of the bypass flow passage via the bypass flow passage and an outside-passing flow in a flow direction of intake air in the intake passage along the outer wall surface of the housing without passing through the bypass flow passage and to guide the merged flow toward a downstream side in the flow direction of intake air in the intake passage with the merged flow narrowed, the throttle including:

two raised portions that are raised from the outer wall surface of the housing with the outlet located therebetween; and a cover that bridges between the two raised portions and is opposed to the outer wall surface of the housing, wherein:

the cover includes an inner surface exposed to the throttle, and an outer surface exposed to outside of the throttle;

a peripheral border of the cover includes an upstream edge which defines the outer surface on an upstream side in the flow direction of intake air in the intake passage;

the outer surface includes a plurality of outer ribs that are not perpendicular to the flow direction of intake air in the intake passage;

ridge lines of the plurality of outer ribs and the upstream edge are formed to be included in an imaginary projecting curved surface that is swollen outward of the throttle; and at least a region of the imaginary projecting curved surface including the upstream edge is swollen more outwardly in a shape of a projecting curved surface further on the downstream side in the flow direction of intake air in the intake passage.

4. The air flow measuring device according to claim 3, wherein:

the inner surface includes a plurality of inner ribs that are not perpendicular to the flow direction of intake air in the intake passage;

ridge lines of the plurality of inner ribs and the upstream edge are formed to be included in another imaginary projecting curved surface that is swollen toward the throttle; and at least a region of the another imaginary projecting curved surface including the upstream edge is swollen more toward the throttle in a shape of a projecting curved surface further on the downstream side in the flow direction of intake air in the intake passage.

5. An air flow measuring device that is adapted to be disposed in an intake passage through which intake air drawn into an internal combustion engine flows and that is configured to take in a part of intake air flowing through the intake passage and to produce an electrical signal which is in accordance with a flow rate of intake air in the intake passage, the air flow measuring device comprising:

a housing that defines a bypass flow passage through which the taken-in intake air passes;

a sensor that is accommodated in the bypass flow passage and is configured to generate the electrical signal as a result of heat transfer between the taken-in intake air and the sensor; and a throttle that is provided on an outer wall surface of the housing and is configured to merge together a bypass-passing flow out of an outlet of the bypass flow passage via the bypass flow passage and an outside-passing flow in a flow direction of intake air in the intake passage along the outer wall surface of the housing without passing through the bypass flow passage and to guide the merged flow toward a downstream side in the flow direction of intake air in the intake passage with the merged flow narrowed, the throttle including:

two raised portions that are raised from the outer wall surface of the housing with the outlet located therebetween; and a cover that bridges between the two raised portions and is opposed to the outer wall surface of the housing, wherein the cover is not opposed to all of a narrow range of the outer wall surface of the housing located between root parts of the two raised portions, and is opposed partly to the narrow range.

6. The air flow measuring device according to claim 5, wherein at least a part of an upstream edge of the cover that defines an upstream side of the cover in the flow direction of intake air is advanced on the downstream side from a line segment that connects together upstream ends of ridge lines of the two raised portions in the flow direction of intake air.

7. The air flow measuring device according to claim 5, wherein at least a part of a downstream edge of the cover that defines a downstream side of the cover in the flow direction of intake air is receded on an upstream side from a line segment that connects together downstream ends of ridge lines of the two raised portions in the flow direction of intake air.

8. The air flow measuring device according to claim 5, wherein:
   one raised portion of the two raised portions is located on a lower side of the other raised portion of the two raised portions in a vertical direction of the device; and
   the cover partly does not span a ridgeline of the one raised portion.

9. The air flow measuring device according to claim 5, wherein the cover includes a hole that passes through the cover.

\* \* \* \* \*